US009499076B2

United States Patent
Kanai et al.

(10) Patent No.: US 9,499,076 B2
(45) Date of Patent: Nov. 22, 2016

(54) VEHICLE SEAT

(71) Applicant: Johnson Controls Technology Company, Holland, MI (US)

(72) Inventors: Yuya Kanai, Yokohama (JP); Akinori Taniguchi, Yokohama (JP); Satoru Watanabe, Yokohama (JP)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 15/024,222

(22) PCT Filed: Sep. 27, 2013

(86) PCT No.: PCT/JP2013/076355
§ 371 (c)(1),
(2) Date: Mar. 24, 2016

(87) PCT Pub. No.: WO2015/045120
PCT Pub. Date: Apr. 2, 2015

(65) Prior Publication Data
US 2016/0236593 A1    Aug. 18, 2016

(51) Int. Cl.
*B60N 2/30* (2006.01)
*B60N 2/07* (2006.01)

(52) U.S. Cl.
CPC ........... *B60N 2/3056* (2013.01); *B60N 2/0715* (2013.01); *B60N 2/0735* (2013.01); *B60N 2/307* (2013.01)

(58) Field of Classification Search
CPC  B60N 2/3056; B60N 2/0715; B60N 2/0735; B60N 2/307
USPC ........................ 297/332, 326, 335, 315, 314; 296/65.05, 65.09, 65.13, 65.11
See application file for complete search history.

(56) References Cited

U.S. PATENT DOCUMENTS

| 8,360,528 B2 * | 1/2013 | Shinohara | B60N 2/01583 296/65.09 |
| 8,757,719 B2 * | 6/2014 | Hayakawa | B60N 2/065 297/331 |
| 2005/0046220 A1 * | 3/2005 | Hernandez | B60N 2/005 296/65.13 |
| 2008/0246299 A1 | 10/2008 | Maeda et al. | |
| 2014/0027572 A1 * | 1/2014 | Ehlers | B64D 11/06 244/118.6 |

FOREIGN PATENT DOCUMENTS

| JP | 63195038 A * | 8/1988 |
| JP | 2006-327501 A | 12/2006 |
| JP | 4994083 B2 | 10/2008 |

OTHER PUBLICATIONS

International Search Report received in corresponding International Application No. PCT/JP2013/076355 dated Nov. 5, 2013 and English translation, 4 pages.

* cited by examiner

*Primary Examiner* — Milton Nelson, Jr.
(74) *Attorney, Agent, or Firm* — Foley & Lardner LLP

(57) ABSTRACT

A vehicle seat includes: a slide mechanism including an inner-side slide rail and an outer-side slide rail; a seat cushion; and a biasing unit for applying a biasing force for flipping up the seat cushion toward a wall portion of a vehicle. The outer-side slide rail includes: a first slide rail fixed to the wall portion at a same position as the seat cushion in a vertical direction; and a second slide rail fixed to a portion of the wall portion located deeper in an interior than the first slide rail, at a position below the seat cushion.

1 Claim, 6 Drawing Sheets

VEHICLE SEAT

CROSS REFERENCE TO RELATED APPLICATIONS

The present application is a U.S. National Stage of International Application No. PCT/JP2013/076355 filed on Sep. 27, 2013, the entire disclosure of which is incorporated herein by reference.

TECHNICAL FIELD

The present invention relates to a vehicle seat which has a slide mechanism for sliding a seat cushion in a front-rear direction of a vehicle and in which the seat cushion can be flipped up toward a side wall of the vehicle to be folded.

BACKGROUND ART

Patent Literature 1 proposes a vehicle seat in which an inner-side slide rail fixed to a floor and an outer-side slide rail fixed to a wall portion allow a seat cushion to slide in a front-rear direction of a vehicle and in which the seat cushion is flipped up toward the wall portion of the vehicle to be folded. The outer-side slide rail includes: an outer-side lower rail having a first base wall portion fixed to the wall portion, a pair of side wall portions erected from two sides of the first base wall portion which are opposite to each other in the lateral direction, and a pair of first folded wall portions bent inward from the side wall portions in the lateral direction and folded toward base ends of the side wall portions; and an outer-side upper rail which is housed in the outer-side lower rail to be smoothly slidable with a bearing and which has a second base wall portion attached to a hinge mechanism installed in the seat cushion, and a vertical wall portion extending from the second base wall portion, and a pair of second folded wall portions bent outward from the vertical wall portion in the lateral direction and folded between the side wall portions and the first folded wall portions to movably support the bearing. The hinge mechanism has spring means, provided around a turning axis of this hinge mechanism, for biasing the seat cushion in a flipping-up direction. Moreover, a rolling member is provided which is pivotally supported on an attaching member fixed between the pair of second folded wall portions of the outer-side upper rail to be capable of turning about a vertical axis and which is disposed between the pair of first folded wall portions of the outer-side lower rail.

CITATION LIST

Patent Literature
  Patent Literature 1: Japanese Patent No. 4994083

SUMMARY OF INVENTION

In the above-described related art, the spring means for biasing the seat cushion in the flipping-up direction applies a lateral load on both the inner-side slide rail and the outer-side slide rail. Accordingly, the slide mechanism may be deformed. In such a case, a great operating force is required to release lock.

An object of the present invention is to provide a vehicle seat in which a slide mechanism is not deformed even when a load caused by a biasing unit for biasing a seat cushion in a flipping-up direction is applied and in which a great force for operating an operation portion is not required to release lock.

A vehicle seat in accordance with some embodiments of the present invention includes: a slide mechanism including an inner-side slide rail fixed to a floor of an interior of a vehicle and an outer-side slide rail fixed to a wall portion of the interior of the vehicle; a seat cushion provided to be slidable in a front-rear direction of the vehicle by the slide mechanism; and a biasing unit for applying a biasing force for flipping up the seat cushion toward the wall portion. The outer-side slide rail includes: a first slide rail fixed to the wall portion at a same position as the seat cushion in a vertical direction; and a second slide rail fixed to a portion of the wall portion located deeper in the interior than the first slide rail, at a position below the seat cushion.

In the above-described configuration, both stress in the first slide rail caused by the biasing unit and stress in the second slide rail caused by the biasing unit are vertical. Accordingly, the first slide rail and the second slide rail are not deformed, a great force for operating the operation portion is not required to release lock, and operation is light. Moreover, an impact load applied to the safety belt due to hard braking or the like is distributed between the first slide rail and the second slide rail. Thus, a plate thickness of a vehicle body can be reduced, and weight can be reduced accordingly.

DESCRIPTION OF EMBODIMENTS

The purpose of providing a vehicle seat in which a slide mechanism is not deformed even when a load caused by a biasing unit for biasing a seat cushion in a flipping-up direction is applied and in which a great force for operating an operation portion is not required to release lock, is achieved with the following configuration. Specifically, a vehicle seat includes: a slide mechanism including an inner-side slide rail fixed to a floor of an interior of a vehicle and an outer-side slide rail fixed to a wall portion of the interior of the vehicle; a seat cushion provided to be slidable in a front-rear direction of the vehicle by the slide mechanism; and a biasing unit for applying a biasing force for flipping up the seat cushion toward the wall portion, wherein the outer-side slide rail includes: a first slide rail fixed to the wall portion at a same position as the seat cushion in a vertical direction; and a second slide rail fixed to a portion of the wall portion located deeper in the interior than the first slide rail, at a position below the seat cushion.

Hereinafter, an embodiment of the present invention will be specifically described with reference to the drawings.

FIGS. 1 to 6 illustrate a vehicle seat 1 according to one embodiment of the present invention. The vehicle seat 1 includes a seat cushion 2 and a seat back 3. In the present embodiment, a description will be made by taking an automobile as an example of a vehicle.

Figure 1:
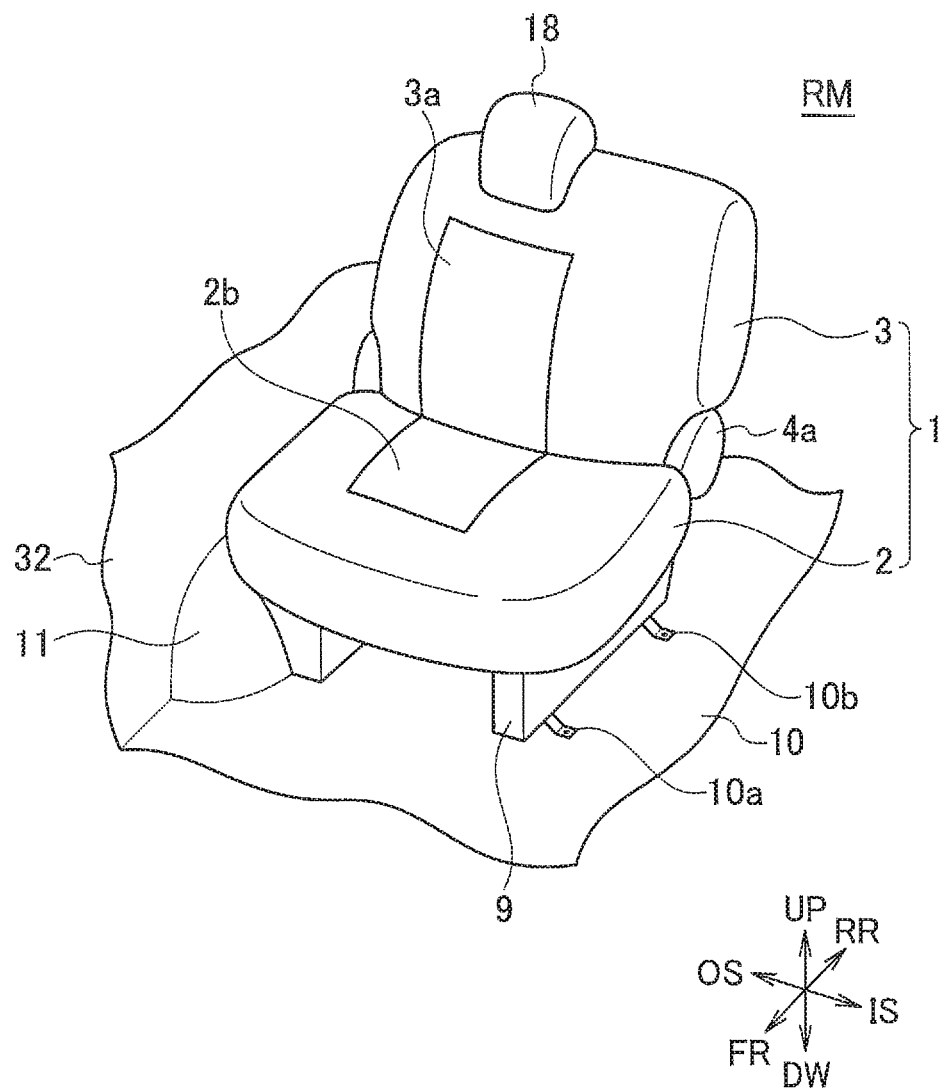
FIG. 1 is a perspective view illustrating, from a front side, a vehicle seat according to one embodiment of the present invention in which a seat cushion is in use.
Figure 2:
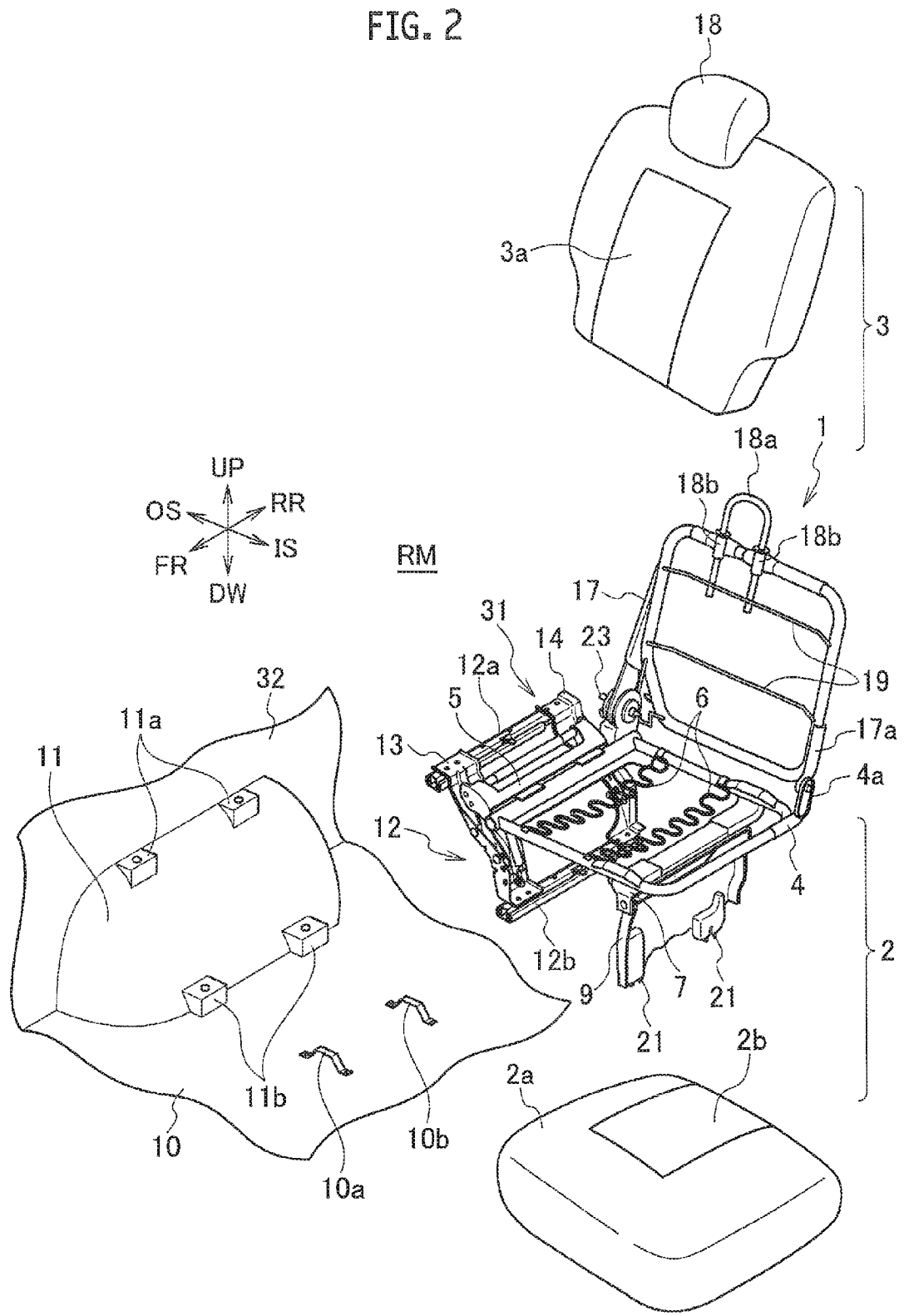
FIG. 2 is an exploded perspective view illustrating a framework of the vehicle seat of FIG. 1 and an attachment portion of a vehicle body.

The seat cushion 2 includes a cushion frame 4 in the form of an iron hollow pipe formed in the shape of a closed rectangular loop when viewed from above; a base frame 5 which covers a right side of the cushion frame 4, i.e., covers from a front side FR to a rear side RR on an exterior side OS in FIGS. 1 and 2, and which is supported on the cushion frame 4 by welding; serpentine springs 6 placed in parallel from the front side FR to the rear side RR of the cushion frame 4; and so-called upholstery 2a which is made of fabric, synthetic leather, or the like and which covers a so-called cushioning material (not illustrated) made of polyurethane foam or the like to cover a framework including the cushion frame 4, the base frame 5, the serpentine springs 6, and the like. The upholstery 2a has a seating surface 2b.

The seat back 3 includes a back frame 17 made of an iron pipe member formed in the shape of a closed loop when viewed from the front side FR into the rear side RR; head rest holders 18b, 18b disposed on an upper side UP of the back frame 17 to support a stay 18a of a head rest 18 such that the stay 28a can be moved toward the upper side UP and a down side DW; and wires 19, 19 disposed at positions separated toward the upper side UP and the down side DW to be supported on end portions of the back frame 17 from the exterior side OS to an interior side IS by welding. The seat cushion 2 and the seat back 3 are rotatably supported through connection portions 4a, 17a with a fifth pin 22. A reclining mechanism 23 is provided in a connecting portion between the seat cushion 2 and the seat back 3.

An inner-side slide rail 7 included in a slide mechanism is fixed to the down side DW of a left side, i.e., the interior side IS in FIGS. 1 and 2, of the cushion frame 4 to extend from the front side FR to the rear side RR. The inner-side slide rail 7, together with an after-mentioned outer-side slide rail 12 included in the slide mechanism, supports the seat 1 such that the seat 1 can slide toward the front side FR and the rear side RR.

A base member 9 is pivotally supported on the down side DW of the inner-side slide rail 7 with a pivot 8 to be capable of rotating between a position (position of FIG. 4) in which the base member 9 is perpendicular to a lower surface 2c (see FIG. 5) of the seat cushion 2 and a position (position of FIG. 5) in which the base member 9 is along the lower surface 2c of the seat cushion 2. The base member 9 can be fixed in the above-described positions with an unillustrated lock unit. Latches 21, 21, which can be respectively engaged with strikers 10a, 10b provided on a floor 10 to be separated toward the front side FR and the rear side RR and can be detached from the strikers 10a, 10b with an unillustrated operation portion, are provided on a lower end portion of the base member 9.

Figure 4:
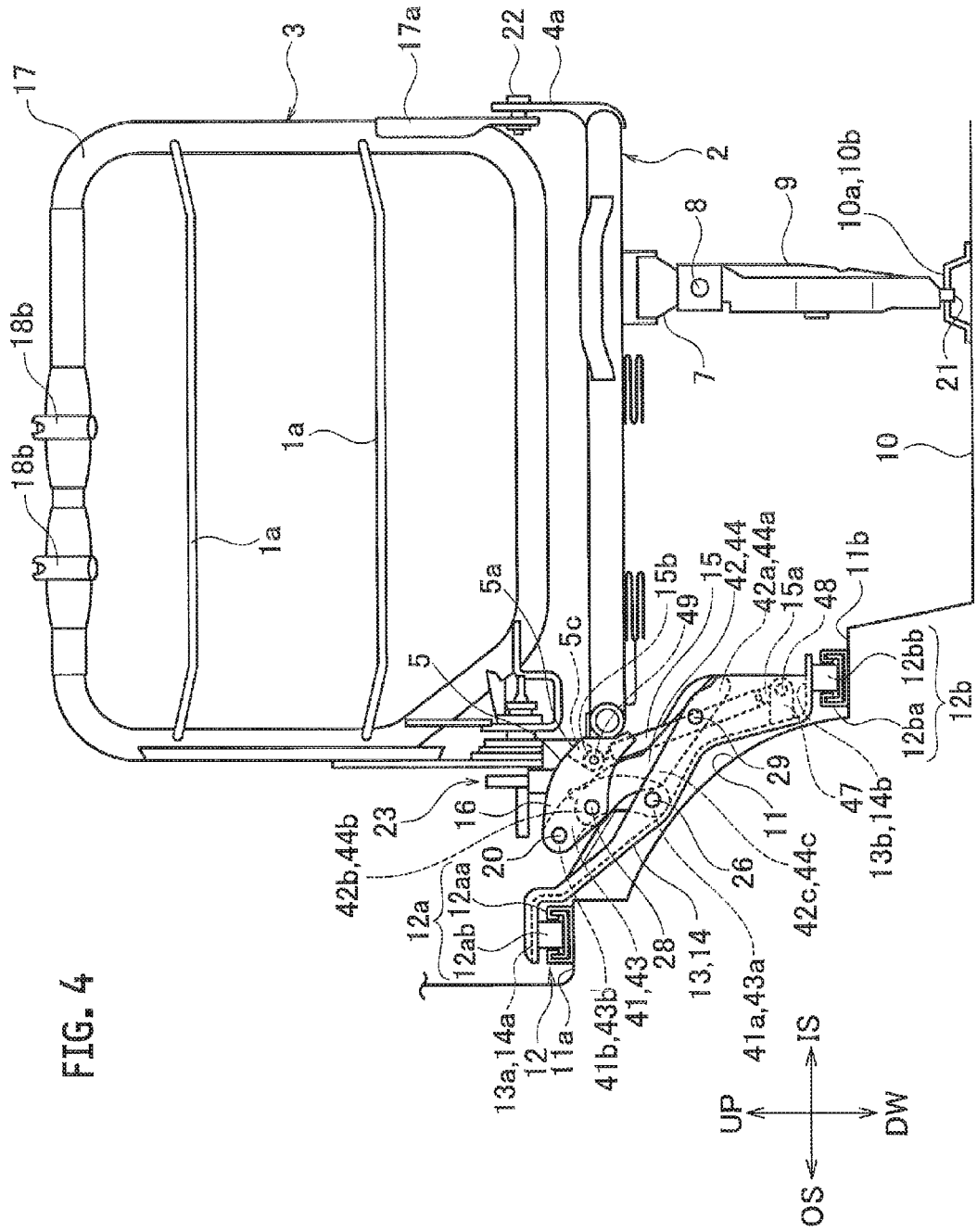
FIG. 4 is a front view illustrating the framework of the vehicle seat of FIG. 3.
Figure 5:
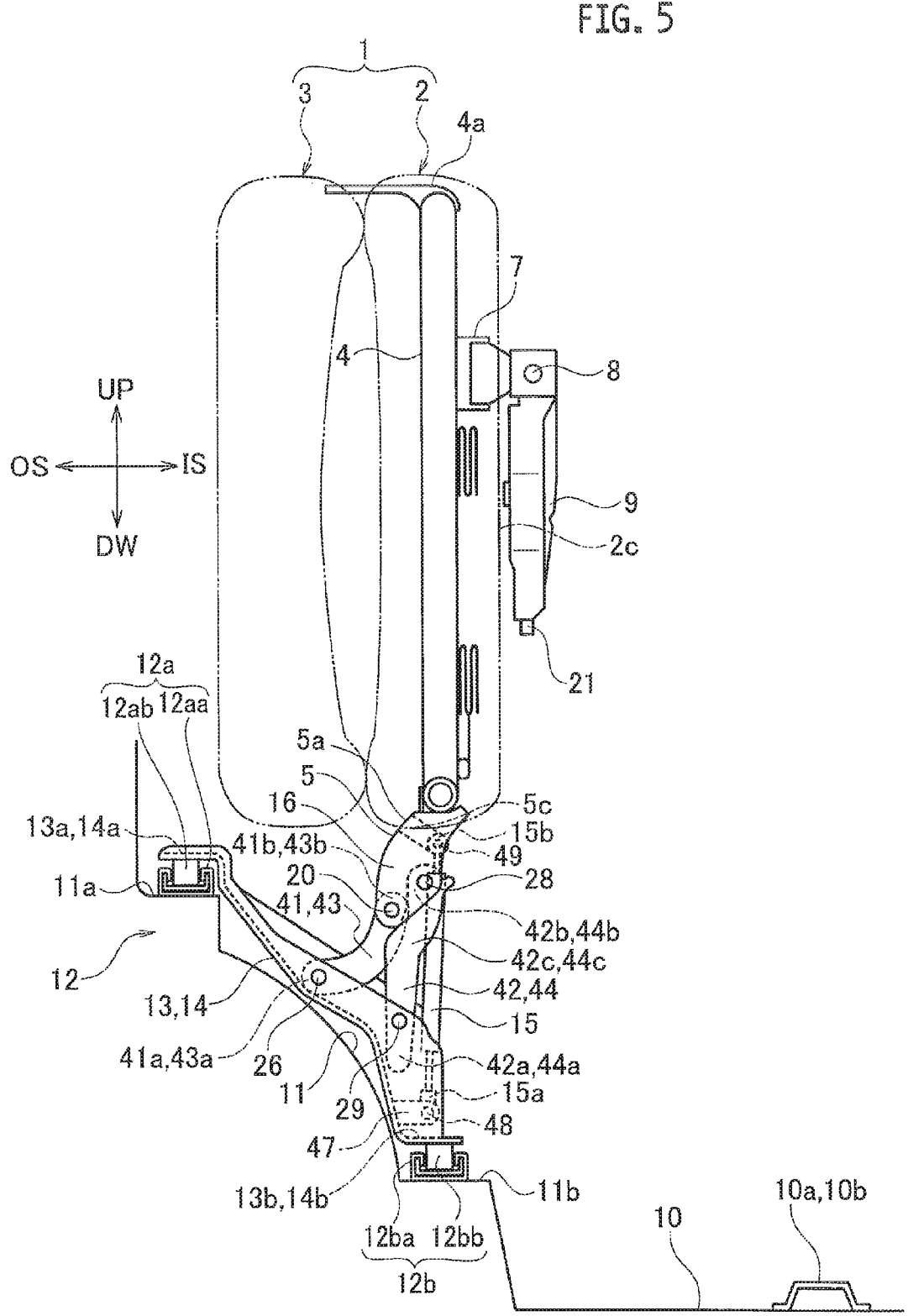
FIG. 5 is a front view similar to FIG. 4 illustrating the framework of the vehicle seat of FIG. 1 in a state in which the seat cushion is folded.

A wheel house 11, which is a wall portion on the exterior side OS formed in a raised manner as viewed from the room RM side as illustrated in FIGS. 1 and 2, is provided between a side panel 32 and the floor 10. First step portions 11a, 11a are formed in a stepped shape on the upper side UP of the wheel house 11, more specifically, at positions at approximately the same height as the seat cushion 2 in the direction from the upper side UP to the down side DW. Second step portions 11b, 11b are formed in a stepped shape on the down side DW of the wheel house 11, i.e., at positions to be located under the down side DW of the seat cushion 2. The first step portions 11a, 11a and the second step portions 11b, 11b are provided to be separated toward the front side FR and the rear side RR by such a distance that the after-mentioned outer-side slide rail 12 can be supported. Moreover, as illustrated in FIGS. 4 and 5, upper surfaces of the first step portions 11a, 11a and the second step portions 11b, 11b for supporting the outer-side slide rail 12 are surfaces approximately parallel to the floor 10.

Figure 6:
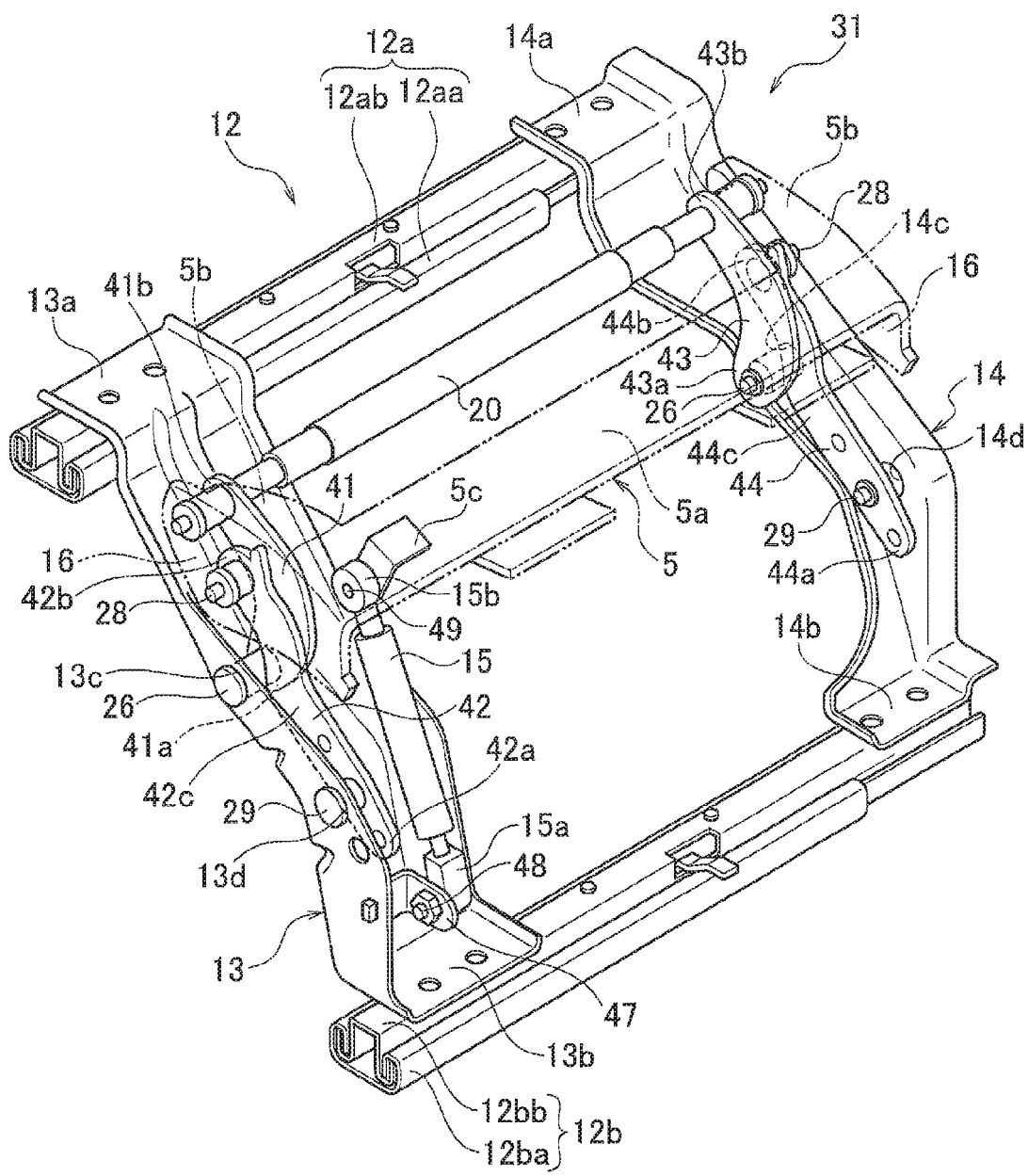
FIG. 6 is a perspective view of a supporting device of the vehicle seat of FIG. 3.

As described previously, the outer-side slide rail 12 is fixed to the first step portions 11a, 11a and the second step portions 11b, 11b. The outer-side slide rail 12 includes a first slide rail 12a to be supported by the first step portions 11a, 11a and a second slide rail 12b to be supported by the second step portions 11b, 11b. The first slide rail 12a includes a fixed rail 12aa to be fixed to the upper surfaces of the first step portions 11a, 11a and a movable rail 12ab to be slidably supported by the fixed rail 12aa. The second slide rail 12b includes a fixed rail 12ba to be fixed to the upper surfaces of the second step portions 11b, 11b and a movable rail 12bb to be slidably supported by the fixed rail 12ba. The second slide rail 12b is fixed to a portion of the wheel house 11 which is located deeper in the interior side IS than the first slide rail 12a, at a position below the seat cushion 2. As illustrated in FIGS. 4 to 6, the fixed rails 12aa, 12ba have approximately U-shaped cross sections having flanges in such directions that end portions open. As illustrated in FIGS. 4 to 6, the movable rails 12ab, 12bb have laterally-facing approximately C-shaped cross sections having flanges in such directions that end portions close such that the flanges of the fixed rails 12aa, 12ba are tacked into the flanges thereof. Ball bearings, pulleys called rollers, or the like which enable smooth sliding are interposed between the fixed rails 12aa, 12ba and the movable rails 12ab, 12bb, but an explanation thereof is omitted because this technique is publicly known.

Elongated front-side and rear-side brackets 13 and 14 extending from the upper side UP to the down side DW along the wheel house 11 are supported on upper surfaces of front end portions and rear end portions of the movable rails 12ab, 12bb. The front side bracket 13 and the rear side bracket 14 have planar portions 13a, 14a in upper end portions thereof. The planar portions 13a, 14a are mounted and supported on the upper side UP of the movable rail 12ab of the first slide rail 12a above upper portions of the first step portions 11a, 11a. Moreover, the front side bracket 13 and the rear side bracket 14 have planar portions 13b, 14b in lower end portions thereof. The planar portions 13b, 14b are mounted and supported on the upper side UP of the movable rail 12bb of the second slide rail 12b above upper portions of the second step portions 11b, 11b. The front side bracket 13 and the rear side bracket 14 are vertically long members extending along the vehicle width direction, i.e., the direction from the exterior side OS to the interior side IS, and having vertical cross section in approximately arched shapes.

The base frame 5 includes a body portion 5a, attachment portions 5b, 5b, and a bracket 5c. The body portion 5a covers the right side of the cushion frame 4, i.e., covers from the front side FR to the rear side RR on the exterior side OS in FIGS. 1 and 2, and is supported on the cushion frame 4 by welding. The attachment portions 5b, 5b are located at a front end portion and a rear end portion of the body portion 5a, and a front seat-side bracket 16 and a rear seat-side bracket 16 (the two are referred to as front and rear seat-side brackets) described later are attached to the attachment portions 5b, 5b by welding. The attachment portions 5b, 5b are formed to protrude in order to improve rigidity. The bracket 5c is supported on a surface on the down side DW of the body portion 5a illustrated in FIGS. 4 to 6 by welding.

A pair of link members 41, 42 and a pair of link members 43, 44 each include two members having different lengths, and are total four unequal members on the front side FR and the rear side RR. One pair of link members 41, 43 paired in the direction from the front side FR to the rear side RR of the automobile are approximately L-shaped (it should be noted, however, that the angle between two sides is not limited to a right angle) in front view. One end portions 41a, 43a of the link members 41, 43 are pivotally supported with first pins 26, 26 inserted through through holes 13c, 14c of the front side bracket 13 and the rear side bracket 14 so that the link members 41, 43 can rotate with respect to the front side bracket 13 and the rear side bracket 14 in a state in which recessed portions of the approximately L-shaped members are directed toward the exterior side OS. One end portions 42a, 44a of the link members 42, 44 paired in the direction from the front side FR to the rear side RR of the automobile are pivotally supported with fourth pins 29, 29 inserted through through holes 13d, 14d of the front side bracket 13 and the rear side bracket 14 so that the link members 42, 44 can rotate with respect to the front side bracket 13 and the rear side bracket 14. Other end portions 41b, 43b of the link members 41, 43 are pivotally supported with a second pin 20 so that the link members 41, 43 can rotate with respect to the front and rear seat-side brackets 16, 16. Other end portions 42b, 44b of the link members 42, 44 are pivotally supported with third pins 28, 28 so that the link members 42, 44 can rotate with respect to the front and rear seat-side brackets 16, 16.

Specifically, the front and rear seat-side brackets 16, 16 fixed to the base frame 5 have the other end portions 41b, 43b and 42b, 44b of the link members 41, 43 and 42, 44 connected thereto with the second pin 20 and the third pins 28, 28, respectively, each of the link members 41, 43 and 42, 44 being installed to be capable of vertical rotation.

Installation is performed such that one pair of link members 41, 43 may be located at more outer positions than the other pair of link members 42, 44 in the vehicle width direction. Thus, the link members 41, 43, 42, 44 are connected so that the second pin 20 can swing along the vehicle width direction like a pendulum without interference between the link members 41, 43, 42, 44.

As illustrated in FIGS. 4 to 6, the link members 42, 44, which are paired in the direction from the front side FR to the rear side RR of the automobile at inner positions in the vehicle width direction, have locking protrusions 42c, 44c provided therein which are crank-shaped in front view and which are provided to protrude downward on lower surface sides of approximately central portions.

The locking protrusions 42c, 44c are configured to come into contact with the first pins 26, 26 to stop vertical rotation toward an outer position in the vehicle width direction during the use of the seat as illustrated in FIG. 4.

In the present embodiment, with the front side bracket 13 and the rear side bracket 14, settings are made so that dimensions between the first pins 26, 26 pivotally supporting one end sides 41a, 43a of the link members 41, 43 and the fourth pins 29, 29 pivotally supporting one end sides 42a, 44a of the link members 42, 44 may be larger than dimensions between the second pin 20 pivotally supporting other end sides 41b, 43b of the link members 41, 43 and the third pins 28, 28 pivotally supporting other end sides 42b, 44b of the link members 42, 44.

The vehicle seat 1 includes a flip-up unit 31 for flipping up the seat cushion 2. The flip-up unit 31 includes the front side bracket 13, the rear side bracket 14, the link members 41, 42 and 43, 44, and a biasing unit 15.

The biasing unit 15 is configured to apply a biasing force for flipping up the seat cushion 2 toward the wheel house 11 (exterior side OS). A gas spring is employed as the biasing unit 15 in the present embodiment, but the present invention is not limited to this. A general spring or the like may be employed. A lower end portion 15a of the biasing unit 15 is pivotally supported on a bracket 47 fixed to the front side bracket 13, with an inclusion 48 interposed therebetween, to be capable of rotating. Moreover, an upper end portion 15b of the biasing unit 15 is pivotally supported on the bracket 5c of the base frame 5 with an inclusion 49 interposed therebetween to be capable of rotating.

The second pin 20 longitudinally extending in the direction from the front side FR to the rear side RR of the automobile is integrally connected to the front and rear seat-side brackets 16, 16.

As illustrated in FIG. 4, the second pin 20 provides a configuration in which in a state in which the seat cushion 2 is not flipped up, i.e., during use, of the seating surface 2b of the seat cushion 2, a lower surface 2c side near a side end portion located at an outer position in the vehicle width direction is supported from the down side DW.

Figure 3:
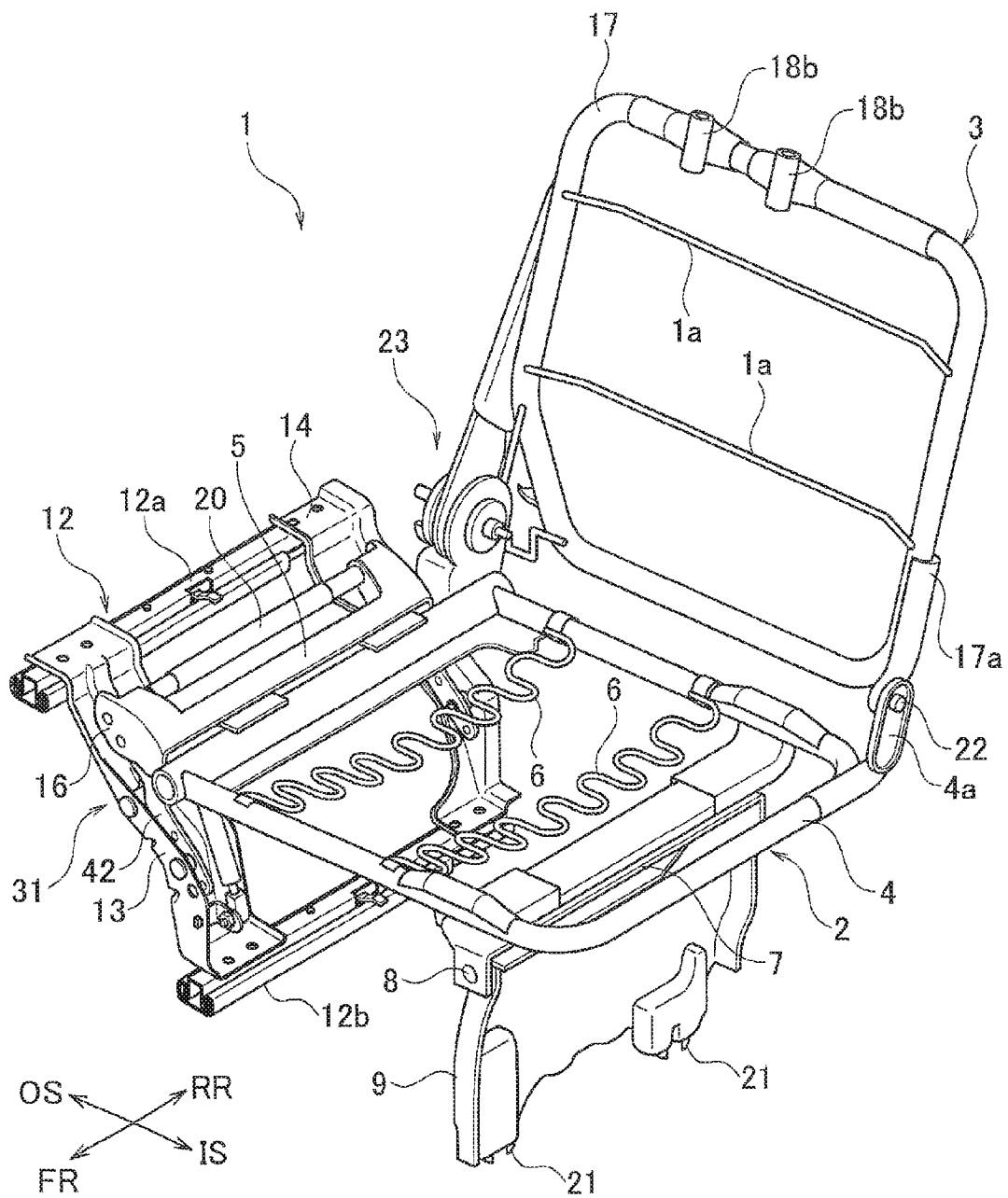
FIG. 3 is a perspective view illustrating, from a front side, the framework of the vehicle seat according to the embodiment of the present invention in a state in which the seat cushion is in use.

In the flip-up unit 31, in a folded state in which the seat cushion 2 is flipped up, as illustrated in FIG. 3, other end sides 42b, 44b of the link members 42, 44 and other end sides 41b, 43b of the link members 41, 43 are moved in the direction of the room RM.

In the present embodiment, an interaxial distance between the link members 41, 43 of the flip-up unit 31 are set smaller than an interaxial distance between the link members 42, 44. Accordingly, connection is made so that the side end portion of the seat cushion 2 supported by the second pin 20 can swing in the vehicle width direction approximately like a pendulum inside view while tracing a curved path which is concave toward the upper side UP.

Thus, a configuration is employed in which movement is made so that in a folded state, aside end surface of the seating surface 2b of the seat cushion 2 which is located at an outer position in the vehicle width direction may be closer to the wheel house 11 than during use.

A gas spring as the biasing unit 15 is interposed between the bracket 5c on the lower surface side of the base frame 5 and the front side bracket 13 fixed to the second step portion 11b of the wheel house 11. Accordingly, the seat cushion 2 is biased and flipped up toward the wheel house 11 as a wall portion on the exterior side OS to be folded.

In the present embodiment, both stress in the first slide rail 12a caused by the gas spring of the biasing unit 15 through first to third rotating plates 25, 16, 27 and stress in the second slide rail 12b caused by the gas spring 15 are vertical. The first and second slide rails 12a, 12b are subjected to no or only small horizontal (lateral) forces. It should be noted that there are gaps between the fixed rails 12aa, 12ba and the movable rails 12ab, 12bb constituting the first and second slide rails 12a, 12b in the vertical and lateral directions in cross sections because of requirements for dimensional accuracy. When the seat including the seat cushion 2 and the seat back 3 is placed on the first and second slide rails 12a, 12b, a load thereof reduces the gaps between the fixed rails 12aa, 12ba and the movable rails 12ab, 12bb in the vertical direction to zero. Specifically, after assembly, the fixed rails

12*aa*, 12*ba* and the movable rails 12*ab*, 12*bb* are in metallic contact. Of relationships between the fixed rails 12*aa*, 12*ba* and the movable rails 12*ab*, 12*bb*, the lateral relationship always involving gaps has room for deformation caused by horizontal (lateral) stress, but the vertical relationship in metallic contact is less prone to having deformation even when vertical stress is applied because pulleys directly receive the stress. Accordingly, the first and second slide rails 12*a*, 12*b* themselves are not deformed by vertical stress caused by the gas spring of the biasing unit 15. Thus, since the first and second slide rails 12*a*, 12*b* themselves are not deformed, a great force is not required to operate the operation portion (not illustrated) for releasing lock, and lock can be released with a light force.

A safety belt (not illustrated) is supported on the first slide rail 12*a* and the second slide rail 12*b*. Accordingly, an impact load applied to the safety belt due to hard braking or the like is distributed between the first slide rail 12*a* and the second slide rail 12*b*. This reduces a load applied to a vehicle body supporting the first slide rail 12*a* and the second slide rail 12*b*. As a result, plate thicknesses of the vehicle body, particularly the floor 10 and the wheel house 11, can be reduced, and weight can be reduced accordingly.

While an embodiment of the present invention has been described above, the present invention is not limited to the above-described embodiment, and various modifications can be made. Although a description has been made by using an example in which an automobile is employed as a vehicle, the present invention is not limited to this, and may be applied to a seat of an airplane, a ship, a carriage, or the like.

The invention claimed is:

1. A vehicle seat comprising:
   a slide mechanism comprising an inner-side slide rail fixed to a floor of an interior of a vehicle and an outer-side slide rail fixed to a wall portion of the interior of the vehicle;
   a seat cushion provided to be slidable in a front-rear direction of the vehicle by the slide mechanism; and
   a biasing unit for applying a biasing force for flipping up the seat cushion toward the wall portion,
   wherein the outer-side slide rail comprises:
      a first slide rail fixed to the wall portion at a same position as the seat cushion in a vertical direction; and
      a second slide rail fixed to a portion of the wall portion located deeper in the interior than the first slide rail, at a position below the seat cushion.

* * * * *